US009163968B2

(12) United States Patent
Foss et al.

(10) Patent No.: US 9,163,968 B2
(45) Date of Patent: Oct. 20, 2015

(54) MAGNETIC FLOWMETER WITH DRIVE SIGNAL DIAGNOSTICS

(71) Applicant: Rosemount Inc., Chanhassen, MN (US)

(72) Inventors: Scot Ronald Foss, Eden Prairie, MN (US); Jared James Dreier, Chaska, MN (US)

(73) Assignee: Rosemount Inc., Chanhassen, MN (US)

( * ) Notice: Subject to any disclaimer, the term of this patent is extended or adjusted under 35 U.S.C. 154(b) by 0 days.

(21) Appl. No.: 14/038,065

(22) Filed: Sep. 26, 2013

(65) Prior Publication Data

US 2015/0082909 A1 Mar. 26, 2015

(51) Int. Cl.
*G01F 1/60* (2006.01)
*G01F 1/58* (2006.01)
*G01F 25/00* (2006.01)
*G01F 15/02* (2006.01)
*G01R 31/02* (2006.01)

(52) U.S. Cl.
CPC *G01F 1/588* (2013.01); *G01F 1/58* (2013.01); *G01F 1/60* (2013.01); *G01F 15/02* (2013.01); *G01F 15/022* (2013.01); *G01F 25/0007* (2013.01); *G01R 31/02* (2013.01)

(58) Field of Classification Search
CPC .................................... G01F 1/58; G01F 1/60
USPC ............... 73/1.34, 861.08, 861.11, 861.16
See application file for complete search history.

(56) References Cited

U.S. PATENT DOCUMENTS

| 4,563,904 A | 1/1986 | Geisler et al. |
| 4,916,381 A | 4/1990 | Gelecinskyj et al. |
| 5,325,728 A | 7/1994 | Zimmerman et al. |
| 5,351,554 A | 10/1994 | Budmiger |
| 5,372,045 A | 12/1994 | Schulz et al. |
| 5,530,639 A | 6/1996 | Schulz et al. |

(Continued)

FOREIGN PATENT DOCUMENTS

| EP | 2 381 224 A2 | 10/2011 |
| GB | 2081449 A | 2/1982 |

(Continued)

OTHER PUBLICATIONS

Notification of Transmittal of the International Search Report and the Written Opinion of the International Searching Authority, or the Declaration for related application PCT/US2010/025728, filed Mar. 1, 2010, 11 pgs.
Notification of Transmittal of the International Search Report and the Written Opinion of the International Searching Authority, or the Declaration for PCT Application No. PCT/US2014/050673, dated Dec. 3, 2014.
Notification of Transmittal of the International Search Report and the Written Opinion of the International Searching Authority, or the Declaration for PCT Application No. PCT/US2014/050673, dated Oct. 31, 2014.

*Primary Examiner* — Lisa Caputo
*Assistant Examiner* — Nathaniel T Woodward
(74) *Attorney, Agent, or Firm* — Westman, Champlin & Koehler, P.A.

(57) ABSTRACT

A magnetic flowmeter includes a flowtube arranged to receive a flow of process fluid. A coil is positioned proximate the flowtube and arranged to apply a magnetic field to the process fluid in response to a drive current alternating direction. First and second electrodes are arranged to sense a voltage potential in the process fluid in response to the applied magnetic field. The voltage potential is indicative of flow rate of process fluid through the flowtube. A sensor is coupled to the first and second current paths which has a sensor output related to the drive current. Diagnostic circuitry provides a diagnostic output as a function of a transient change in the sensor output when current flowing through the coil alternates direction.

20 Claims, 5 Drawing Sheets

(56) References Cited

U.S. PATENT DOCUMENTS

| | | | |
|---|---|---|---|
| 5,639,970 A * | 6/1997 | Schulz | 73/861.12 |
| 6,453,754 B1 | 9/2002 | Florin | |
| 6,611,775 B1 | 8/2003 | Coursolle et al. | |
| 6,644,127 B1 | 11/2003 | Matzen | |
| 6,920,799 B1 | 7/2005 | Schulz | |
| 7,619,418 B2 | 11/2009 | Schulz et al. | |
| 7,921,733 B2 | 4/2011 | Foss et al. | |
| 8,590,361 B1 * | 11/2013 | Feller | 73/1.34 |
| 2006/0081067 A1 | 4/2006 | Budmiger | |
| 2006/0095217 A1 | 5/2006 | Coursolle et al. | |
| 2008/0250866 A1 | 10/2008 | Tschabold et al. | |

FOREIGN PATENT DOCUMENTS

| | | |
|---|---|---|
| GB | 2 152 220 A | 7/1985 |
| WO | WO 01/90704 A2 | 11/2001 |
| WO | WO 2008/042290 A2 | 4/2008 |
| WO | WO 2011/128656 A1 | 10/2011 |

* cited by examiner

MAGNETIC FLOWMETER WITH DRIVE SIGNAL DIAGNOSTICS

BACKGROUND

The present invention relates to magnetic flowmeters of the type used to measure flow of process fluid. More specifically, the present invention relates to diagnostics of such flowmeters.

A magnetic flowmeter measures the volumetric flow rate of a conductive fluid by detecting the velocity of the fluid passing through a magnetic field. Magnetic flowmeter systems typically include a flowtube assembly and a transmitter assembly. The flowtube assembly is installed in a process piping line, either vertically or horizontally, and includes a pipe section, a coil section and electrodes. The coils are located on opposite sides of a cross section of the pipe. The coils, energized by a coil drive current from the transmitter, develop a magnetic field along the cross section of the pipe. Two electrodes are located across the pipe from each other generally along a line which is perpendicular to the magnetic field. Fluid passing through the pipe is electrically conductive. As a result of the conductor movement through the magnetic field, an electric potential or electromotive force (EMF) is induced in the fluid which can be detected across the electrodes. Operation is thus based on Faraday's law of electromagnetic induction.

Various types of failures can occur in a magnetic flowmeter which can lead to a current path which is in parallel with the coils. This parallel current path can cause some of the electric current to be shunted away from the coils, thereby leading to a reduced magnetic field applied to the process fluid. This reduced magnetic field will result in a reduced EMF being detected by the sense electrodes. The flow will be low by the amount of current lost. There are various situations which may cause such parallel current paths to arise. For example, the coils in the magnetic flowmeter flowtube may be compromised by process fluid leaking into the coil compartment. This can cause an electrical path in parallel with the coils. Similarly, if one of the transistors which are used to switch current through the coils fails, it may cause some of the coil current to be shunted past the coil through a parallel path. This leads to a reduction in the applied EMF and a corresponding reduction in the output from the sense electrodes. This will lead to inaccurate flow measurements.

Failures in components used to apply the coil drive signal, as well as failures or degradation in the current path of the coil drive signal, can reduce the magnetic field applied to the process fluid. This can lead to errors in flow measurements. Various diagnostic techniques have been used to detect such problems. For example, U.S. Pat. No. 7,921,733 entitled MAGNETIC FLOWMETER WITH COIL GROUND PATH DETECTION to Foss et al., issued Apr. 12, 2011 and assigned to Rosemount Inc. describes a particular diagnostic technique.

SUMMARY

A magnetic flowmeter includes a flowtube arranged to receive a flow of process fluid. A coil is positioned proximate the flowtube and arranged to apply a magnetic field to the process fluid in response to a drive current alternating direction. First and second electrodes are arranged to sense a voltage potential in the process fluid in response to the applied magnetic field. The voltage potential is indicative of flow rate of process fluid through the flowtube. A sensor is coupled to the first and second current paths which has a sensor output related to the drive current. Diagnostic circuitry provides a diagnostic output as a function of a transient change in the sensor output when current flowing through the coil alternates direction.

DETAILED DESCRIPTION OF ILLUSTRATIVE EMBODIMENTS

Figure 1:
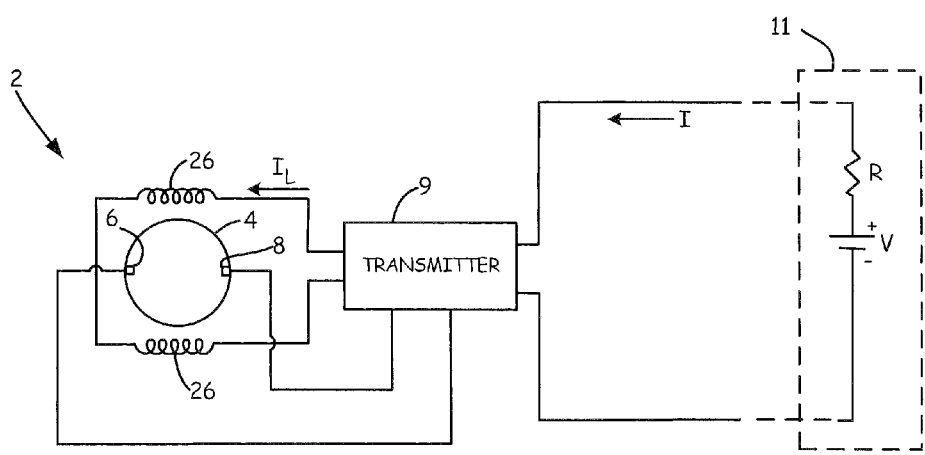
FIG. 1 is a simplified block diagram of a magnetic flowmeter in a two-wire communication loop.

In FIG. 1, magnetic flowmeter system 2 connects to two-wire communication 4-20 mA loop carrying current I and an external power source (not shown). Flowtube 4 carries a flow of process fluid. Transmitter 9 supplies coil drive current $I_L$ to coils 26 adjacent flowtube 4 which generate a magnetic field in the process fluid. Electrodes 6,8 mount in flowtube 4 along a line perpendicular to the magnetic field in the fluid for sensing EMF induced by the fluid flow and the applied magnetic field. Transmitter 9 senses the EMF between electrodes 6,8 and controls a DC output current I representative of the sensed EMF which is, in turn, proportional to fluid flow. Transmitter 9 transmits current I over a 4-20 mA current loop to a remote receiving station 11. Transmitter 9 can communicate using any appropriate technique and is not limited to a 4-20 mA current loop. Other example communication techniques include those in accordance with the process industry standard protocol such as Highway Addressable Remote Transducer (HART®), FOUNDATION™ Fieldbus or any other appropriate protocol. Further, the process control loop can comprise a wireless process control loop in which information is communicated wirelessly, for example, using the WirelessHART® communication protocol in accordance with the IEC 62591 Standard, or other communication technique or protocol.

Figure 2:
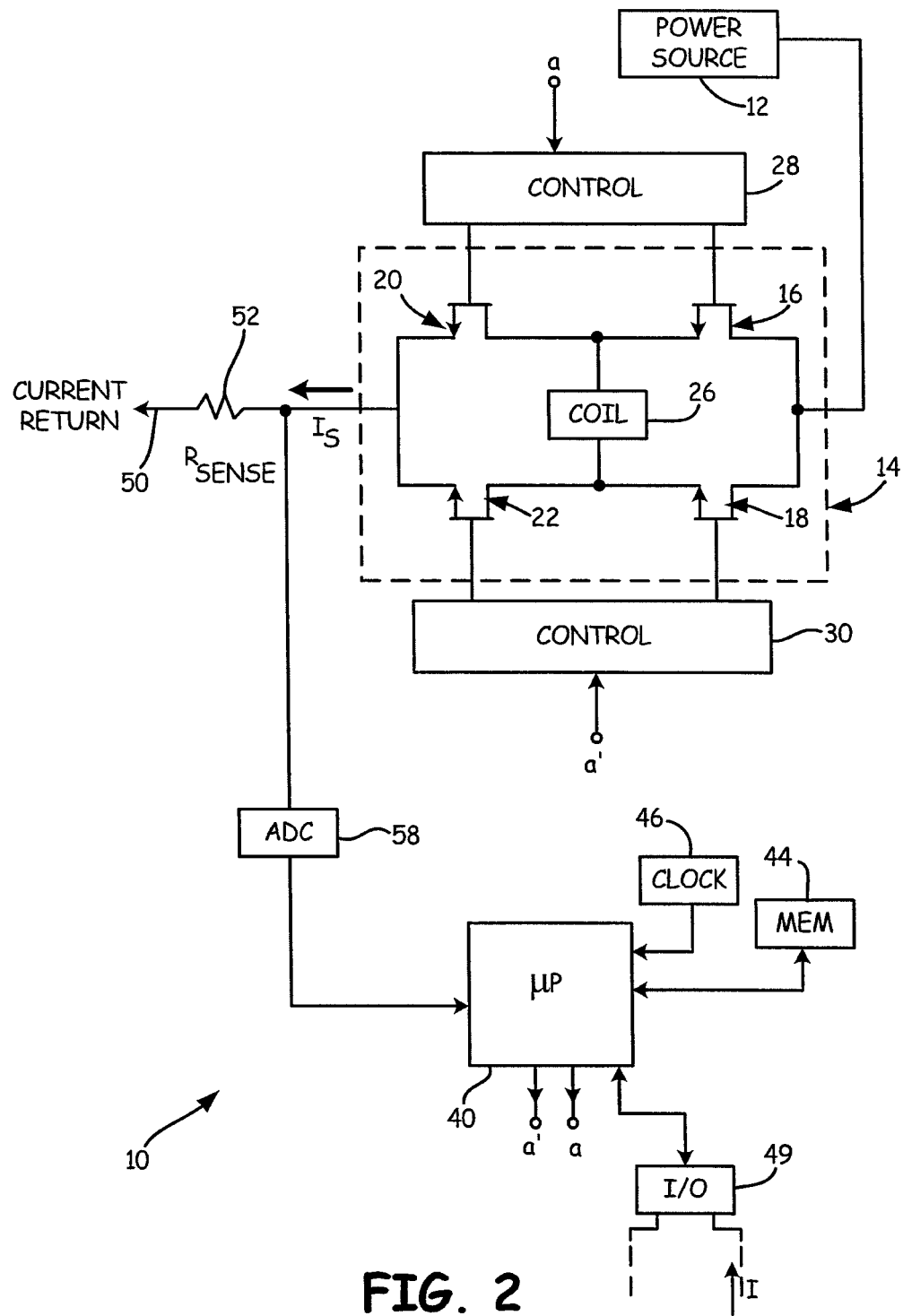
FIG. 2 is a schematic diagram showing a bridge pulse controlled current driver for the magnetic flowmeter of FIG. 1.

FIG. 2 shows H-bridge driver circuitry 10 in transmitter 9. H-bridge driver circuitry 10 of magnetic flowmeter system 2 generates alternating drive current $I_L$ to a coil 26. In H-bridge driver 10, power source 12 energizes a transistor bridge circuit 14. In bridge circuit 14, control circuits 28 and 30 connect to the gates of field effect transistor (FET) 16, FET 18, FET 20 and FET 22 to switch them on in pairs to provide alternating current through coil 26. Power source 12 connects to drain terminals of FETs 16 and 18. The source terminal of FET 16 and the drain terminal of FET 20 connect to one side of the coil 26. Similarly, the source of FET 18 and the drain of FET 22 connect to the other side of coil 26. Control circuits 28 and 30 convert input HIGH and LOW logic levels to desired voltage bias levels compatible to the gates of transistors 16, 18, 20, 22 for switching between ON and OFF states.

Microprocessor 40 produces control outputs a and a' at the desired operating frequency, typically 5 Hz as a function of the sensed current. Outputs a and a' provide logic levels to circuits 28 and 30, respectively. Microprocessor 40 is connected to memory 44, clock 46, operator input/output (I/O) circuitry 49 and loop I/O circuitry 49. Memory 44 contains programming instructions to control operation of microprocessor 40. Microprocessor 40 operates at a speed determined by clock 46. Input/output circuitry 49 is used to provide an output connection, for example to a process control loop.

Current $I_S$ from power source 12 flows to return path 50 through a sense resistor $R_{SENSE}$ 52. Analog to digital converter (ADC) 58 connects to sense resistor 52 and provides an output representative of the current through coil 26 to microprocessor 40. The output of ADC circuitry 58 is representative of the magnitude of current $I_S$ flowing through sense resistor 52. Microprocessor 40 monitors the amplitude of $I_S$ as discussed below.

Figure 3A:
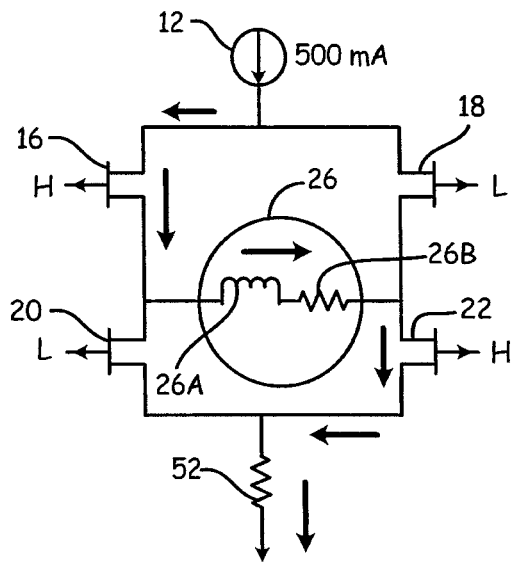
FIG. 3A is a simplified diagram showing drive circuitry coupled to a magnetic coil in one configuration.
Figure 3B:
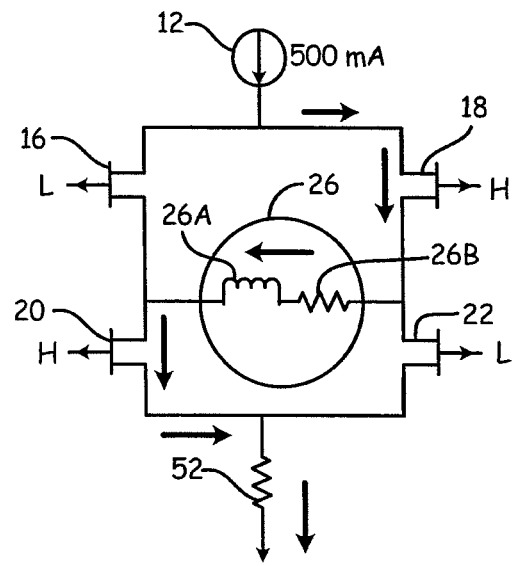
FIG. 3B is a simplified diagram showing the drive circuitry coupled to the magnetic coil in a second configuration.

FIGS. 3A and 3B are simplified diagrams showing the conditions of field effect transistors 16-22 during normal operation. Coil 26 is modeled as an inductor 26A and a resistor 26B. In FIG. 3A, field effect transistors 16 and 22 are in a closed condition while transistors 18 and 20 are in an open condition. This allows current from power supply 12 to flow through coils 26 in the direction indicated. In contrast, in FIG. 3B, field effect transistors 16 and 22 are open while transistors 18 and 20 are in a closed position. This allows the current from power source 12 to flow in the direction indicated.

Various types of failures in electrical components in the magnetic flowmeter can lead to errors that are not readily detectable. For example, some types of failures can cause a portion of the current to be shunted around the coil 26 and flow through a parallel current path which is electrically in parallel with coil 26. This parallel current path diverts some of the current from flowing through coil 26 and thereby results in a reduced magnetic field being applied to the process fluid. Failures caused by such parallel current paths will be undetected by simply measuring current flowing through the sense resistor 52. Example failures which may lead to a parallel current path include one or more of the field effect transistors 16-22 electrically shorting, or partially shorting. Another example of a parallel current path is an electrical shorting or partial shorting within the coil 26 wiring. Similarly, process fluid which may come in contact with wiring can cause a portion of the current from source 12 to follow a parallel current path which does not go through coil 26.

Figure 4:
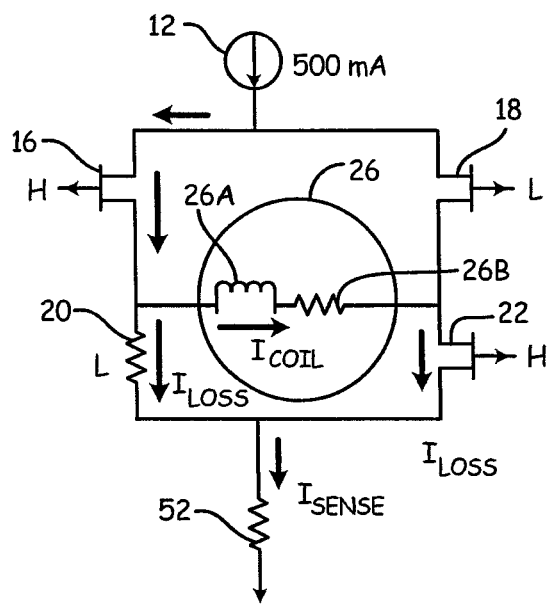
FIG. 4 is a simplified schematic diagram illustrating a failure in a transistor of the drive circuitry.

FIG. 4 illustrates one example failure condition which causes a parallel current path. In FIG. 4, field effect transistor 20 is partially electrically shorted and provides a 10 ohm resistance when switched "off." This causes a portion of the current ($I_{LOSS}$) to flow through field effect transistor 20 even though it is the off condition, rather than flowing through coil 26. In the example shown in FIG. 4, this leads to a current loss of half of the total current, i.e. 250 mA, if the tube is also 10 ohms. Note that the current flowing through the sense resistor 52 is still the total current from source 12, i.e. 500 mA.

Figure 5:
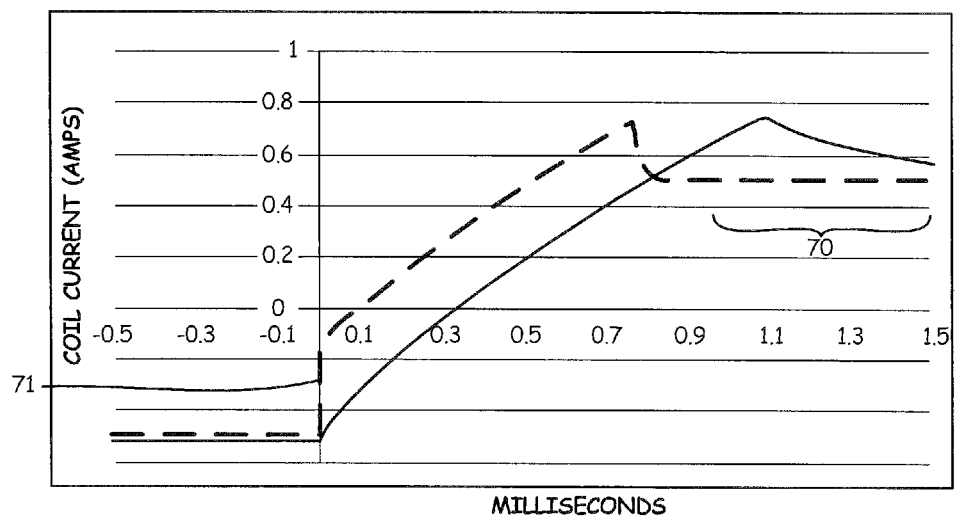
FIG. 5 is a graph of sense resistor current versus time.

Typically, a failure of the type shown in FIG. 4 would not be detected. However, by monitoring the current flowing through the sense resistor 52 in the time domain, rather than simply a static current level, additional diagnostic information may be obtained. Specifically, when the current flowing through the coil 26 switches between the two current paths illustrated in FIGS. 3A and 3B, a transient signal is applied to the coil 26. The inductance 26A of the coil resists this change and introduces a lag or time delay in the current which reaches the sense resistor 52. This is illustrated by the solid line in the graph of FIG. 5. Specifically, FIG. 5 illustrates a graph of coil current during normal operation (solid line) and a graph of coil current when there is a 140 ohm parallel current path (dashed line). As illustrated in FIG. 5, the current flowing through the parallel current path bypasses the inductance 26A and therefore does not exhibit this time delay. This is illustrated by the dashed line shown in FIG. 5. Thus, the parallel current path through resistor 20 causes the current through the sense resistor 52 to change substantially immediately when switching between the two current paths. The rapid transition (transient) 71 in the coil current illustrated in FIG. 5 is caused by the source voltage 12 being applied by the coil driver 12 as it transitions between the two current paths. In the graph of FIG. 5, one can determine the amount of current flowing through the parallel current path, $I_{LOSS}$ as being equaled to V/R which equals 40 volts/140 ohms which yields a 286 mA step change. Based on this example, one can see that even if the parallel current path resistance is high enough to only cause a 1% reduction in the coil current, the step change which would be apparent across the sense resistor 52 would be 29 mA which can easily be detected with detection circuitry.

The magnitude of the initial current across sense resistor 52 can be used to estimate the amount of current which is bypassing the coil 26 through the parallel current path. Thus, it is possible to correct for errors in the sensed electrode voltage by determining the current in the parallel path. The combined resistance of the sensor coil 26B and the parallel current path can be calculated by measuring the coil voltage and the coil current during the DC portion of the wave form (portion 70 illustrated in FIG. 5). The $R_{Short}$ can be calculated by measuring the current step change and the applied voltage. $R_{Short}$=V/I=40 Volts/286 mA=40 ohms. Once $R_{Total}$ and $R_{Short}$ are found, $R_{Coil}$ can be calculated as follows:

$$RTotal = \frac{R_{Coil} * R_{Short}}{R_{Coil} + R_{Short}} \quad \text{EQUATION 1}$$

Once these resistances are determined, the amount of current that actually flows through the sensor coil can be determined in accordance with Equation 2:

$$ICoil = \frac{I_{Sense} * R_{Total}}{(R_{Coil})} \quad \text{EQUATION 2}$$

Using the actual current flowing through the coil, the applied magnetic field may be determined and the resulting sensed voltage (EMF) compensated appropriately to accurately detect flow. This allows the device to operate in a limp mode whereby flow measurements may be obtained prior to repairing the device. For example, an electrical short or a partial short caused by process fluid in the coil 26, may self repair with time as the process fluid evaporates or drains from the affected area. In such a situation, the transmitter may operate in a limp mode until the problem is corrected.

Some failures may cause an asymmetric change in the sense resistor current as the current switching between the two paths. By monitoring which of the two current paths causes an immediate rise in the sensed current through sense resistor 52, it may be possible to identify which pair of transistors contains the failing or failed transistor. Further, if an immediate rise is detected symmetrically in the conduction cycles as current switches between the two current paths, the failure can be isolated as something other than a failed transistor. For example, an electrical short or a partial short within the coil 26 or wiring to the coil 26, will cause a symmetric change in the wave form through sense resistor 52 during switching. This information can be used to instruct an operator regarding repair or replacement procedures between a transmitter or flowtube problem.

Figure 6:
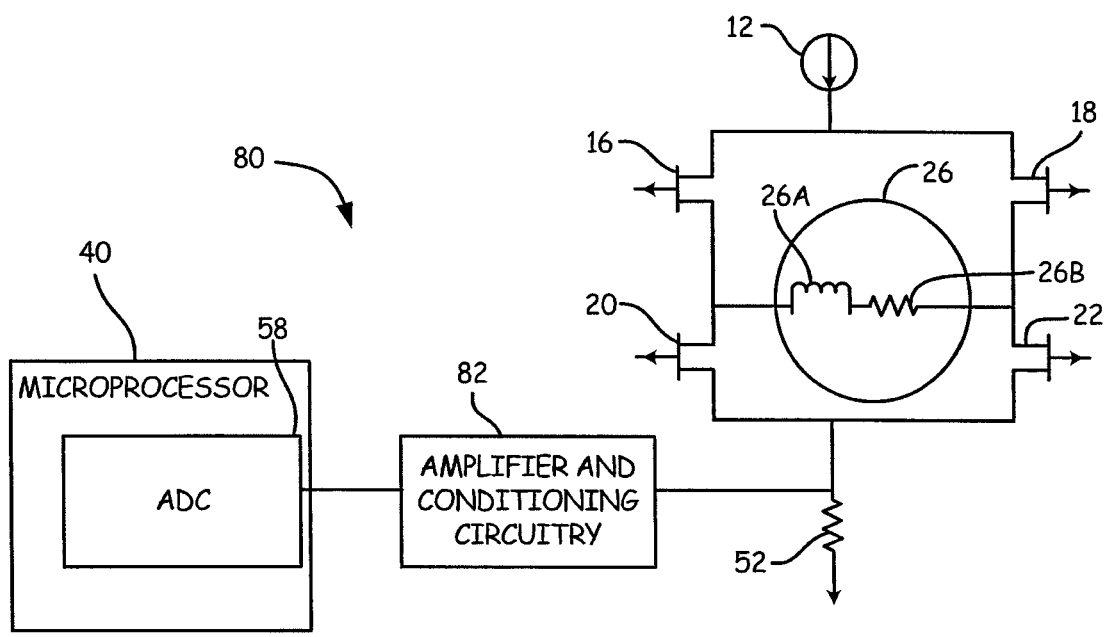
FIG. 6 is a schematic diagram showing diagnostic circuitry for detecting a parallel current path.

FIG. 6 is a simplified diagram showing diagnostic circuitry 80 for detecting a parallel current path. Sense resistor 52 provides a coil current measurement to diagnostic circuitry 80. Diagnostic circuitry 80 includes amplifier and conditioning circuitry 82 which amplifies and filters a voltage across the sense resistor 52. The output of amplifier and conditioning circuitry 82 is provided to an analog to digital converter 58 which can be located in microprocessor 40.

In other aspects, a signature of the waveform of the current flowing through sense resistor 52 is monitored and used for diagnostic purposes. A reference or baseline signature can, for example, be stored in memory 44 illustrated in FIG. 2. The diagnostics can be based on a percent change, a comparison with a threshold, a particular waveform signature, or other comparison using the current flowing through the sense resistor.

Although the present invention has been described with reference to preferred embodiments, workers skilled in the art will recognize that changes may be made in form and detail without departing from the spirit and scope of the invention. The diagnostics of the present invention are based upon temporal variations in the current flowing through the sense resistor. These variations can be monitored to identify a transient or step-change which can be used to estimate the amount of current flowing through a parallel current path which is diverted from the magnetic coil. By measuring the step change in the current flowing through the sense resistor as the current transitions between the two current paths, it is possible to determine the amount of current flowing through the parallel current path. In another example, the diagnostics of the present invention are based upon the transient response seen in the sense resistor current when the coil drive current switches direction through the magnetic coil. The size of this transient signal is related to the resistance of a parallel current path which bypasses the inductance of the magnetic coil. The sense resistance 52 used to measure current flowing through the H-bridge is simply one example of a sensor. Other configurations could be used including a Hall effect sensor. Upon detection of a failure, the diagnostic circuitry can provide an output to another location or may provide an output on a local operator interface or otherwise annunciate an alarm condition.

What is claimed is:

1. A magnetic flowmeter, comprising:
   a flowtube arranged to receive a flow of process fluid;
   a coil proximate the flowtube arranged to apply a magnetic field to the process fluid in response to an alternating coil drive current;
   first and second electrodes arranged to sense a voltage potential in the flowtube in response to the applied magnetic field, the voltage potential indicative of flow rate of process fluid through the flowtube; and
   a sensor coupled to the coil having a sensor output related to the drive current; and
   diagnostic circuitry having a diagnostic output as a function of identification of a transient step change in the sensor output when current flowing through the coil alternates direction.

2. The apparatus of claim 1, wherein a flow measurement is compensated based upon the transient step change due to loss of coil current.

3. The apparatus of claim 2, wherein the compensation is based upon a magnitude of the transient step change.

4. The apparatus of claim 1, wherein the diagnostic circuitry identifies an asymmetric transient step change when the current flowing through the coil alternates direction.

5. The apparatus of claim 4, wherein the asymmetric transient step change is indicative of a failing component in coil drive circuitry.

6. The apparatus of claim 1, wherein the diagnostic circuitry identifies a symmetric transient step change when the current flowing through the coil alternates direction.

7. The apparatus of claim 6, wherein the symmetric transient step change is indicative of a failure in the coil, coil wiring, and/or flowtube.

8. The apparatus of claim 1, including an analog to digital converter which digitizes the coil current measurement.

9. The apparatus of claim 1, wherein the sensor comprises a sense resistance.

10. The apparatus of claim 1, wherein the diagnostics circuitry compensates flow measurements based upon the transient step change.

11. A method of detecting a failure in a magnetic flowmeter, comprising:
    applying a coil drive current through a magnetic coil of the magnetic flowmeter through a first current path;
    sensing current flowing through the first current path;
    applying the coil drive current to the magnetic coil through a second current path;
    sensing current flowing through the second current path;
    providing a diagnostic output based upon identification of a transient step change observed in sensed current when the coil drive current switches from the first current path to the second current path.

12. The method of claim 11, including compensating a flow measurement based upon the transient step change.

13. The method of claim 12, wherein the compensation is based upon a magnitude of the transient step change.

14. The method of claim 11, including identifying an asymmetric transient step change when the current flowing through the coil switches from the first current path to the second current path and from the second current path to the first current path.

15. The method of claim 14, wherein the asymmetric transient change is indicative of a failing component in coil drive circuitry.

16. The method of claim 11, including identifying a symmetric transient step change when the current flowing through the coil switches from the first current path to the second current path and to the second current path to the first current path.

17. The method of claim 11, wherein the symmetric transient step change is indicative of a failure in the coil, coil wiring, and/or flowtube.

18. The method of claim 11, including converting the sensor output to a digital format.

19. The method of claim 11, wherein the sensing uses a sense resistance.

20. The method of claim 11, including providing the diagnostic output based upon a transient step change observed in the second sensed current.

* * * * *